Feb. 17, 1970     T. H. FAIRBANKS     3,496,266

PROCESS FOR RETICULATING FOAMED NYLON STRUCTURE

Filed May 29, 1967

United States Patent Office 3,496,266
Patented Feb. 17, 1970

3,496,266
PROCESS FOR RETICULATING FOAMED
NYLON STRUCTURE
Theodore H. Fairbanks, West Chester, Pa., assignor to
FMC Corporation, Philadelphia, Pa., a corporation of
Delaware
Filed May 29, 1967, Ser. No. 641,769
Int. Cl. B29d 27/00; B29h 7/20; B29c 25/00
U.S. Cl. 264—321    8 Claims

ABSTRACT OF THE DISCLOSURE

A foamed nylon material, formed of contacting cells which provide a skeletal structure of interconnected strands with membranes partitioning contiguous cells and joined to the skeletal structure, is exposed to an aqueous solution of a phenol to remove the cell membranes, leaving the skeletal structure of nylon material which is suitable, for example, as a filter.

---

The present invention is directed to the manufacture of reticulated nylon structures, and particularly reticulated nylon webs.

Reticulated structures, and particularly reticulated polyurethane foams, are disclosed in the prior art. The United States patent to Volz 3,171,820 discloses a number of methods for producing reticulated foams. One method disclosed in the Volz patent involves subjecting a foamed opened cell, cellular polyurethane foam to the hydrolytic action of water in the presence of a hydrolysis catalyst which accelerates the hydrolytic action until at least substantially all membraneous polyurethane is removed from the foam. Another method described by Volz involves passing a high temperature flame front, generated by an expanding gas mixture, through a membrane-bearing, open-celled polyurethane foam. Still another method disclosed by Volz involves a prolonged exposure of an open-celled polyurethane foam to non-catalyzed aqueous hydrolytic conditions at about room temperature. In a still further method mentioned in the Volz patent, an open-celled polyurethane foam is heated in the presence of steam for a prolonged period.

A United States patent to Geen 3,175,025, is also directed to a process for making reticulated polyurethane structures which comprises providing a combustible mixture of an oxidizer material and an oxidizable material within a cellular polyurethane material having heat destructible membranes and thereafter igniting the mixture to thereby produce a reticulated structure.

In another United States patent to Geen 3,175,030 a method is described in which an open-celled polyurethane foam is subjected to a light pulse of sufficient intensity or energy to remove some portion of or all of the cell membranes.

As indicated by the above patents, the prior art is primarily concerned with reticulated polyurethane structures and, while such structures are suitable for various uses including fluid filtering, their applications are greatly limited by the aging instability of polyurethane and the comparatively low strengths of the reticulated polyurethane structures. Accordingly, a primary object of this invention is to provide a new or improved and generally more satisfactory reticulated structure formed of nylon and a method for producing the same.

Another object is to manufacture a reticulated nylon web.

Still another object is the manufacture of a reticulated web of nylon in which the molecules thereof are oriented to impart to the web improved strength and smooth fabric-like properties.

A further object is the provision of a rapid and simple method for converting a generally closed-cell foamed material of nylon into a skeletal or reticulated structure.

Still further objects will appear in the following description of the invention.

These objects are accomplished in accordance with the present invention by a method in which a foamed nylon material having contacting cells which together provide a skeletal structure formed of a network of interconnected strands and membranes or windows joined to the skeletal structure and partitioning contiguous cells, is exposed to an aqueous solution of a phenol until the membranes or windows are partially, and preferably substantially, completely removed. The strands and their junctures are of greater thickness than the cell membranes and thus maintain the integrity of the network of interconnected strands throughout this treatment.

This network of nylon strands and the somewhat thicker strand-interconnecting junctures which are recovered define a skeletal or reticulated structure which can perhaps be best visualized as consisting of a plurality of polyhedrons having polygonal faces, each of which is common to adjacent polyhedrons and being substantially free of membranes or windows.

Preferably, and particularly in the case of a nylon web, the closed-cell foamed nylon material is stretched at least along one and desirably along both of its axial directions to induce orientation of the molecules thereof. Such stretching provides the finished reticulated material with a smooth, fabric-like appearance and, more important, the molecular orientation imparts greater strength to the skeletal structure than it would otherwise possess. Of still further significance, stretching of the closed-cell foamed nylon material reduces the thickness of the cell membranes and may perhaps cause some of the membranes to rupture, thus permitting the treating solution to more rapidly penetrate into the foam material.

Neither the degree, rate, or manner of stretching of the nylon material is critical for satisfactory practice of the method of the present invention. Of course, if a finished reticulated structure having high strength characteristics is desired, the nylon material is stretched to its maximum degree without inducing tearing. On the other hand, if stretching of the nylon material is performed primarily to enlarge the openings or pores thereof, the degree of stretching can be adjusted accordingly. Stretching of the closed-cell nylon material along biaxial directions can be effected in two separate stages with the initial stretch extending either longitudinally or transversely of the material, or the material may be stretched simultaneously along both of its axial directions without substantially affecting the characteristics of the finished reticulated material.

Preferably, the nylon material, once stretched, is held in its extended condition during its treatment with the solution of the phenol. In this manner, relaxation of the stretched material during treatment is avoided and more rapid and uniform penetration of the treating solution is obtained. In applications where strength is a prime consideration, it is preferred that the reticulated material be further tensioned, as for example from about 1% to 10%, after its treatment with the solution of a phenol to remove any residual elongation which may exist in the material and thus assure that the highest degree of orientation is achieved.

The duration of exposure of a foamed nylon material to the treating solution will, of course, vary with such factors as the concentration of phenol in the solution and the solution temperature. Any water-soluble aromatic phenolic compound may be employed in the practice of the present invention. However, phenol itself has been found to provide for rapid removal of cell membranes of foamed nylon material with a minimum of degradation of the remaining skeletal or reticulated structure and is therefore preferred.

Desirably, the concentration of the phenolic compound, such as fo example phenol, in the aqueous treating solution can be varied to provide a solution containing from about 0.5% to 10% (saturation) of phenol, and preferably from about 5% to 8% or 10% of phenol. The amount employed, however, will depend upon the temperature of the solution, which itself may vary from 10° C. to 90° C., with a temperature of about 60° C. being preferred.

The larger the concentration of the phenol in the treating solution, the more rapid is the rate of foam reticulation. However, as the concentration of the phenol in the treating solution aproaches and exceeds the saturation level, the solution separates into two phases, one part consisting of phenol dissolved in water, while the other includes water dissolved in the phenol.

Increasing amounts of the phenol can be dissolved by the addition of a strong base, such as NaOH, KOH, etc. The amount of base added will range between that which will fully dissolve the phenol which is present and that which will bring the proportion of moles of base to moles of the phenol to about 1:2.3. In this manner, the concentration of phenol and/or phenol ions in the solution can be increased to about 19% and more. A molar proportion of base to phenol below the minimum of about 1:2.3 was found to be only marginally active in reticulating of nylon foams. On the other hand, exceeding the solubility of phenol generally results in uneven and excessive attack on portions of the nylon foam network and, for most purposes, is undesirable.

With treating solutions within the range of conditions noted above, the duration of exposure of a stretched foamed nylon material will extend for about 0.1 second to 10 seconds, and under the preferred conditions a 1-second treatment is sufficient.

Immediately after exposure to the treating solution for the period necessary to effect removal of the cell membranes or windows, the remaining skeletal or reticulated nylon structure is washed in a bath of hot water, which may also contain a small amount of base to arrest the action and assist in the removal of the solution therefrom. When an after-stretching of the reticulated nylon structure is necessary or desirable, it is preferably achieved during the cleaning of the structure within the hot water bath. Drying of the washed reticulated structure may be effected in any convenient manner, such as by blowing heated air through the structure.

The resulting reticulated nylon structure possesses better stability to aging than polyurethane foams and can be advantageously employed in filtering both liquids and gases. The reticulated nylon structures of the present invention and particularly those which have molecular orientation, are adapted also for a variety of other uses, such as heat insulating fabrics, mats, pads, screens, etc.

Figure 1:
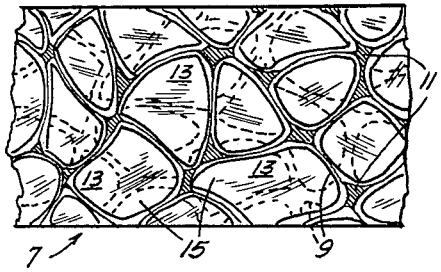
FIGURE 1 is a fragmentary view, on an enlarged scale, of a section of a closed-cell cellular or foamed nylon material prior to being reticulated in accordance with the method of the present invention.

In the production of a cellular nylon material as shown in FIGURE 1 of the drawing a solid chemical blowing agent, such as azodicarbonamide, sold under the name of "Kempore" 125 by National Polychemical Ind., or p,p',-oxi-bis (benzenesulfonyl hydrazide), sold under the name of "Celogen" by Naugatuck Chemical Company, is incorporated into a polyamide or nylon resin of the poly- hexamethylene-diamine-adipic acid type, such as nylon 66, or the poly-5-aminocaproic acid type, such as nylon 6. Such solid chemical blowing agents can be conveniently and uniformly applied as a powder or dust onto the surfaces of nylon resin pellets which may have been pre-treated, as for example with mineral oil.

This mixture of nylon resin and solid chemical blowing agents is then charged into an extruder, heated to a molten condition while being mixed under pressure, and then extruded through a slot or other orifice into a zone of lower pressure, such as the ambient room atmosphere. The blowing agents decompose when heated and thus generate gases which serve to expand or foam the nylon resin at its issues into the zone of lower pressure. The extruded foamed nylon material or web is then cooled, as by contact with a chilled roller or within a quench bath. The resulting foamed nylon web is of generally closed-cell cellular construction.

As more fully described in United States Patent 3,251,911 solid chemical blowing agents, such as those mentioned above, decompose exothermally when heated and elevate the temperature of the thermoplastic material locally. It is in these heat centers that nucleation of the generated gases occurs and at which expansion or foaming of the molten nylon resin takes place as it issues from the extruder. Nucleation of gases within the molten resin can also be obtained by incorporating into such resin discrete particulate matter which is insoluble in the resin itself.

Of course, by increasing the number of nucleation sites which are present in the molten resin, a greater number of cells is formed when such resin expands. These cells, however, are of smaller size and are more uniformly distributed. Thus, in preparing the foamed nylon web for use in the method of the present invention, it is preferred that metal powders, such as zinc dust, be intermixed with the nylon resin, along with the solid chemical blowing agent, to insure that the resulting foamed nylon web have a uniform distribution of fine or small cells.

As shown in FIGURE 1 of the drawing, a foamed nylon web 7, which has been formed as described above, includes strands 9 which are interconnected at junctures 11 to provide a network structure, and thin membranes or windows 13 which extend between the strands 9 and partition adjacent cells 15 from each other.

The nylon web 7 is preferably stretched in a convenient manner, and desirably to equal degrees, in directions extending along both its longtiudinal and transverse axes to effect orientation of the molecules. As heretofore mentioned, stretching of the foamed nylon web is not necessary for satisfactory practice of the present invention but is preferred in view of the greatly improved strength properties which such web exhibits after reticulation.

With the foamed nylon web maintained in its extended or stretched condition, it is immersed or otherwise exposed to an aqueous solution containing about 0.5% to 10% (saturation), and desirably from about 5% to 8% or 10% of phenol. Alternatively, the treating solution may also include a strong base, such as NaOH or KOH, in a molar proportion to the phenol of about 1:2.3, to thereby increase the solubility and thus the concentration of the phenol which such solution may contain. The temperature of the treating solution may range from about 10° C. to about 90° C., and, for the sake of ease of operations and simplicity, is desirably at about 60° C. While the duration of web immersion in the phenol solution can be varied, under the preferred conditions exposure of the net for about one second will be adequate.

Figure 2:
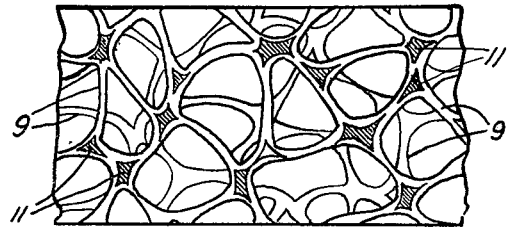
FIGURE 2 is a view similar to FIGURE 1 illustrating the three-dimensional reticulated nylon structure of the present invention.
Figure 3:
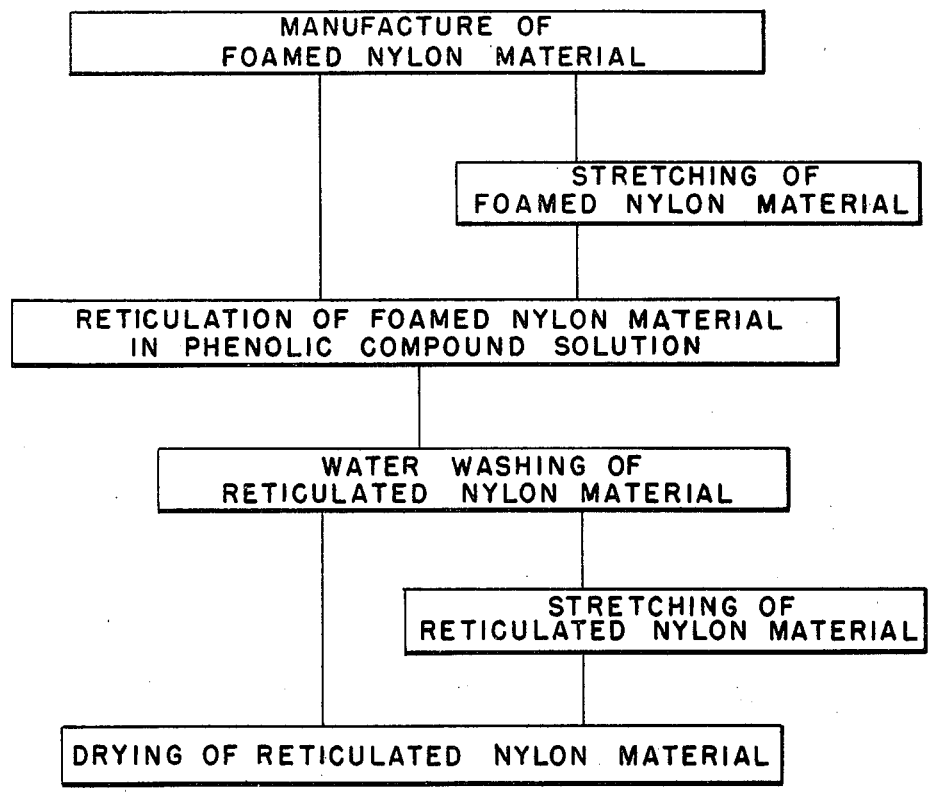
FIGURE 3 is a diagram showing the steps employed in the method of the present invention.

As heretofore mentioned, the phenol solution removes the membranes or windows 13 of the foamed nylon web, leaving behind a structure formed of a network of interconnected strands 9, as shown in FIGURE 2. The cell membranes of the foamed nylon web are much thinner than the strands 9 and the still thicker strand junctures 11 and thus are rapidly removed without causing serious degradation in the remaining skeletal structure.

Immediately following this treatment, this now reticulated web structure is washed in a bath of hot water, preferably containing a small amount of base to arrest the action and remove the phenol solution therefrom. While within this wash bath, the reticulated nylon web is preferably extended to insure that maximum stretching and molecular orientation has been achieved. The manufacture of the reticulated web is now completed and dried, as by warm air; and collected or cut into sections.

The invention is illustrated by the following specific examples:

EXAMPLE I

A blend consisting of 1,000 grams of nylon-6 resin, sold under the name of "Plaskon" by Allied Chemical Company, 10 grams of azodicarbonamide, sold under the name of "Kempore" 125 by National Polychemical, Ind., and 10 grams of fine zinc powder was charged into a ¾-inch "Wayne" bench top extruder, an extruder manufactured by Wayne Machinery & Die Co. of Garfield, N.J. At the exit of the extruder barrel was located a die having a slit shaped to provide a web one-inch in width and 6 mils in thickness and modified so as to have its internal cross-section gradually decrease from its entrance to its exit.

The extruder was heated at three zones, with the rear portion of the barrel (entrance) being maintained at 215° C. while the front portion of the barrel and die were heated to 282° C. To obtain maximum back pressure immediately upstream from the die slit, the extruder screw was operated at full speed.

The molten nylon resin foamed as it issued from the extrusion die slit and into the ambient room atmosphere and was quenched as a web on a rotating chill roller. This quenched molten nylon resin had a uniform distribution of small cells indicating that the azodicarbonamide, together with the zinc powder, provided for good nucleation of the gases generated within the molten resin.

A longitudinal stretch of 100% of the foamed nylon web was achieved by passing the same over a series of differential speed rolls, after which the web was stretched 150% in a transverse direction by means of a conventional tenter frame.

While still under tension, the foamed and now oriented nylon web was immersed for one second in an aqueous solution of about 5%, by weight of phenol which was at room temperature. This treatment achieved the desired removal of the cell membranes leaving a reticulated structure formed of interconnected strands which was then washed with water heated to 70° C. and containing 0.1% NaOH to neutralize the phenol solution. During the washing step the reticulated nylon web was further stretched about 2%. The finished reticulated nylon web was then dried and found suitable for use as a filtering medium.

EXAMPLE II

An oriented foamed nylon web, formed as described in Example I, was immersed in a solution containing 12 grams of phenol and 100 cc. of water. This solution, however, separated into two phases, one containing phenol dissolved in water and the other water dissolved in phenol. Upon the addition of 5 grams of NaOH, the phenol-rich phase was completely dissolved and rendered the solution clear and homogeneous. However, desired reticulation of the foamed nylon net could not be achieved in such base-containing solution, even after a five-minute period of immersion.

Additional amounts of 4, 6, 8 and 10 grams of phenol were successively added to the base-containing solution and, while the solution remained clear and homogeneous, it did not effect reticulation of the foamed nylon sample. Upon the addition of 2 more grams of phenol, this solution was still clear and homogeneous and was found to be highly effective in achieving the desired reticulation of the foamed nylon web.

This final solution contained a total of 24 grams of phenol to 5 grams of NaOH, a weight ratio of 4.8 to 1 or a 2.3 to 1 in molar proportion. The concentration of phenol and/or phenol ions was about 18.6% by weight.

EXAMPLE III

To further establish the minimum molar ratio of 1 to 2:3 of base to phenol, a solution of 6 grams of phenol and 2.5 grams of NaOH in 100 cc. of water was found to be inactive in effecting reticulation of an oriented foamed nylon web which was formed as described in Example I. Upon the addition of 6 grams of phenol to provide a mole ratio of base to phenol of 1:2.3, the solution was effective in achieving reticulation and had a phenol concentration of 10.25%, by weight.

A similar solution containing 22 grams of phenol and 10 grams of NaOH in 100 cc. of water (16.7% phenol by weight) did not give rise to reticulation of an oriented foamed nylon web. Such web could be reticulated, however, upon adding of 26 grams of phenol giving a 1 to 2.3 mole ratio of NaOH to phenol.

EXAMPLE IV

A sample of unstretched, closed-celled nylon foam was examined under a low power microscope, where it was observed that at least 95% of the membranes at the surface were intact. The sample was then immersed for 10 second in a solution containing 5 gms. NaOH, 30 gms. phenol, and 100 cc. $H_2O$. It was then rinsed immediately in water. It was dipped twice more in the solution, rinsing thoroughly each time. The treated sample was then examined microscopically again, when it was seen that between 50 and 75% of the surface membranes had been opened, giving a substantial degree of porosity at the sample surface.

I claim:

1. A method of making a reticulated structure formed of a network of interconnected strands of nylon resin which includes the steps of subjecting a foamed generally closed-cell cellular material formed of nylon resin to an aqueous solution of a phenol containing at least 0.5%, by weight, of phenol to remove membraneous portions of the foam cells whereby a skeletal network of interconnected strands of nylon remains, removing the solution of the phenol from the skeletal network and drying the network.

2. A method as defined in claim 1 wherein said solution contains from 0.5% to 10%, by weight of phenol.

3. A method as defined in claim 1 wherein said solution further includes a strong base, the molar proportion base to phenol being at least 1 to 2.3 and not exceeding the solubility of phenol in said solution.

4. A method as defined in claim 1 wherein the foamed cellular material of nylon resin is stretched in a direction extending at least along one of its longitudinal and transverse axes prior to being subjected to said solution.

5. A method as defined in claim 4 wherein said foamed cellular material is maintained in its stretched condition while being subjected to said solution.

6. A method as defined in claim 5 wherein the solution of the phenol is removed by washing the skeletal network in hot water and further including the step of stretching the skeletal network during washing thereof along directions in which it had been originally stretched to remove residual elongation therefrom.

7. A method as defined in claim 6 wherein said solution is at a temperature of from 10° C. and 90° C.

8. A method as defined in claim 1 wherein said solution is at a temperature of from 10° C. and 90° C. and wherein said solution contains from about 5% to 10%, by weight, of phenol.

(References on following page)

References Cited

UNITED STATES PATENTS

| | | |
|---|---|---|
| 2,130,948 | 9/1938 | Carothers. |
| 2,961,710 | 11/1960 | Stark _____ 264—321 XR |
| 3,125,541 | 3/1964 | Hwa et al. _____ 264—321 XR |
| 3,125,542 | 3/1964 | Haines _____ 264—321 XR |
| 3,171,820 | 3/1965 | Volz _____ 264—321 XR |
| 3,300,558 | 1/1967 | Grant et al. _____ 264—321 |
| 3,403,203 | 9/1968 | Schirmer _____ 264—321 XR |
| 3,405,216 | 10/1968 | Garrett et al. _____ 264—321 |
| 3,405,217 | 10/1968 | Garrett et al. _____ 264—321 |

PHILIP E. ANDERSON, Primary Examiner

U.S. Cl. X.R.

264—54, 232, 288, 340; 260—2.5